United States Patent [19]

Erickson

[11] Patent Number: 5,748,347
[45] Date of Patent: May 5, 1998

[54] IMAGE RECORDING MEDIUM AND METHOD OF MAKING SAME

[75] Inventor: Ronald R. Erickson, Brooklyn, N.Y.

[73] Assignee: Hologram Technology International, Inc., Brooklyn, N.Y.

[21] Appl. No.: 710,074

[22] Filed: Sep. 10, 1996

Related U.S. Application Data

[63] Continuation of Ser. No. 277,401, Jul. 19, 1994, abandoned.

[51] Int. Cl.⁶ ........................ E03H 1/26
[52] U.S. Cl. ............... 359/23; 359/15; 359/19; 359/22; 359/25; 359/34; 359/35
[58] Field of Search .............. 359/1, 9, 10, 15, 359/19, 22, 23, 25, 28, 32, 34, 35

[56] References Cited

U.S. PATENT DOCUMENTS

| | | | |
|---|---|---|---|
| 3,940,619 | 2/1976 | Ellingson et al. | 378/23 |
| 4,353,616 | 10/1982 | Leclere et al. | 359/12 |
| 4,688,880 | 8/1987 | Tatsuno et al. | 359/19 |
| 5,138,471 | 8/1992 | McGrew | 359/25 |

FOREIGN PATENT DOCUMENTS

3-188480  8/1991  Japan.

*Primary Examiner*—Thong Nguyen
*Assistant Examiner*—Darren E. Schuberg
*Attorney, Agent, or Firm*—Kenyon & Kenyon

[57] ABSTRACT

A product, method, and apparatus are provided for making a stereoscopic hologram from a series of two-dimensional views of an object. The two-dimensional views are obtained from, for example, computer analysis of scans taken by standard medical diagnostic equipment. The views are reproduced on an LCD screen, and the screen then serves as the modulator of the holographic object beam. An exposure of each view is sequentially made on a different section of a holographic recording medium, which may be, for example, a photopolymer placed on a substrate. As the observer views the finished product, each eye looks at a different section of the hologram, thus providing a stereoscopic effect.

73 Claims, 5 Drawing Sheets

IMAGE RECORDING MEDIUM AND METHOD OF MAKING SAME

This application is a continuation of application Ser. No. 08/277,401, filed on Jul. 19, 1994, now abandoned.

TECHNICAL FIELD

The present invention relates to means and methods for recording images of three-dimensional objects such as internal organs of the body.

BACKGROUND

The uses of holography are many and varied. However, the information contained in a single hologram, while startling to one new to holography, may not be enough to convey important concepts about the object imaged. Holographic stereograms are combinations of many holograms. Their information content is correspondingly much greater. The holograms they produce are correspondingly far more useful. If the holographic stereogram is constructed of images from a computer, anything which may be imaged by a computer may have a three-dimensional rendition made. Thus, holographic stereoscopy has applications in numerous fields, such as architecture, design, and medicine. While all of these applications are possible, the current invention will be described in the context of the medical field.

Until relatively recently, the only method for obtaining images of the inside of the human body was through the use of x-rays. Generally, x-rays produce images of the body by passing radiation through the body and causing the radiation to fall on an unexposed photographic plate, which simply records an image which comprises the shadow of the physiology being imaged. The intensity and shape of the various parts of the image can be interpreted by a skilled practitioner to obtain a wide variety of data. For example, it is possible to determine the presence, quality and extent of organs, their parts, tumors, growths, swellings, and so forth.

X-ray prints typically take the form of large sheets of negative film and are stored in envelopes that fit conveniently in the manilla paper files used to store other patient records. They may be easily viewed by the practitioner without the need for special equipment, and are conveniently transportable by the mails or otherwise.

However, x-rays, because of their nature, can only convey a limited amount of information. The mere shadows of the information that one is seeking fails to convey much useful and often vital information. While conventional x-rays continue to be used, the limitations of that technology have become less important with the introduction and development of numerous alternative imaging techniques. These include nuclear magnetic resonance imaging (MRI), ultrasonic imaging, positron emission tomography (PET scan), computerized tomography x-ray scanning (CT scan), monoclinal antibody radio imaging, radio nuclide imaging, and other state of the art systems.

While the informational reach of such systems vastly exceeds that of the conventional x-ray method, the ability of such systems to provide hard copies is extremely limited. For example, a CT scan system will typically provide a series of images which represent a limited number of cross-sectional views of the physiology under examination.

While, in principle, it is possible to make copies of substantially all possible images, costs may be prohibitive, the film generated would be bulky, and the difficulties of working with such a record make this impractical.

Nevertheless, after a first CT scan and an evaluation of a limited number of selected images by a professional, a reference to a different type of specialist may be in order. There the inadequacy of the record may make another CT scan desirable or even necessary.

Still another problem with such systems is the difficulty of mentally transforming a series of cross-sectional views into a three-dimensional image. Often, details of apparent minor significance in a single image, when evaluated in the context of the set of images produced by the system, may reveal exactly the type of subtle abnormality that is diagnostically significant.

Viewed in terms of information theory, the redundancy between different frames comprises additional information which, in noisy environments, can be used to improve the signal-to-noise ratio for the desired image information. Because of the relationship between the various frames in the scan, even different frames of different areas which are relatively close to each other can be used to derive redundancy information.

Naturally, even when the entire scan record is available at a particular site, the ability of the human mind to integrate multiple sections into a three-dimensional image is limited. To expect the user to perform the additional task of effectively deriving redundancy information is beyond reasonable expectations.

Accordingly, computer-based software systems have now been developed which are capable of using a computer to generate a two-dimensional rendered view of the 3-dimensional physiology under examination from the data provided by the above state of the art imaging systems. However, every scan has the raw information for an infinite number of rendered views, each corresponding to a different point of view of a theoretical observer who can view the hidden object(s) as if plainly visible. Depending on the point of view, the particular rendered image will show certain three dimensional features and will obscure other features because they are behind features that are displayed. If we consider the case of any limited set of particular rendered views that may be reduced to a hard copy on the instruction of a first practitioner, these may not be the ones that a later practitioner would have selected. There may still be a need or desire for an additional set of views, making for the possibility of an additional scan and attendant expense, and perhaps even a life-threatening delay.

In addition, redundancy between different computer generated rendered images may not be apparent from viewing these different rendered views, because of the discontinuity between the different views. This, of course, is not the case with the type of three-dimensional examination that the human mind has evolved and is equipped to perform, namely the examination of a scene from a continuously and gradually varying series of points of view.

A number of systems have tried to come to grips with this problem. U.S. Pat. Nos. 3,547,510 and 4,834,476 each describe, to some extent, the use of holographic stereograms to allow many different views of an object. However, neither of these references discloses an invention, for example, with an easy-to-use imaging system that requires no computed pre-distortion of the image.

Attempts at better imaging have been made in U.S. Pat. Nos. 3,832,027, 5,216,528, 4,445,749, and 4,411,489. To some extent, these all use a number of two-dimensional views of an object to create a three-dimensional hologram. However, they all suffer from the drawback of having to create some hard copy of the two-dimensional images. For example, they may require many computer-generated plots, a series of photographic images on film, or a number of transparencies. None of these systems, for example, discloses a system allowing a direct modulation of the object beam, without an intervening medium such as film. U.S. Pat. No. 4,964,684 describes a method to perform this modulation. In particular, a liquid crystal display is used to modulate the phase of the beam. However, the reference, which incorporates another liquid crystal display to distort the beam, does not achieve the simplicity of the present invention.

There is a need for a stereoscopic holography system that uses a screen display to eliminate film from the intermediate step. Furthermore, there is a need for a system that predistorts the beam in a simple manner but so as to achieve excellent image quality. In particular, there is a need for a system which provides an enormous amount of structural data in an easy-to-use form.

SUMMARY OF THE INVENTION

The invention solves the problem of how to provide continuous structure information with respect to an object or a part of the human body in a form that is easily storable in conventional files, is easily transported, substantially eliminates the need for having specialized equipment for viewing, and achieves the above without excessive costs.

More particularly, this is achieved by providing raw image information to a computer which processes this information into a three-dimensional image, which may be encoded into any one of a number of existing formats for three-dimensional image data, either in the form of a rastorization or otherwise. The raw image information may also advantageously be sent to an image generator, which then sends the data to the computer.

It should be noted that the images are preferably from medical scans of the human body, but need not necessarily be so. The technology of the present invention encompasses manufacturing a hologram from any object as long as separate two-dimensional images of differing views of that object may be displayed on a screen. Other possible objects may include architectural works or other designs. In fact, current computer-assisted design systems make the depiction of differing two-dimensional views of these objects very convenient. As such, they may be well-utilized by the current invention.

If a medical scan is used, it may be from, e.g., an x-ray, a CAT scan, a PET scan, an MRI scan, an ultrasonic scan, and so on. In this case, the object imaged is likely an organ of the human body.

A plurality of "views" of the three-dimensional information are then generated for the three-dimensional image data. Each of the views corresponds to one of a sequence of views from adjacent points of view. These points of view can be at the same distance from the image or at a varying distance therefrom. Typically, the points of view represent the views from a series of points on a path of movement of a viewer along a line of observation, with each point being a distance from the other point to provide at least marginally discernable differences between the views from adjacent points.

In accordance with the invention, a first of these two-dimensional views is then sent to a screen which creates an image in space of a view. The screen may be a flat panel display and is preferably a liquid crystal display. The image corresponds to a perspective projection from the point of view to the object with the image depicting features of the object in positions determined by the intersection of solid lines of projection from the point of view to the object. In other words, the image looks like what an observer's eye would see. The first of these images is recorded on a first section or strip of recording media. This media is coated on a film and may be an emulsion but is preferably a photopolymer. Such recording is done holographically and this makes the resultant image visible with a particular angular point of view only over a narrow range of angles which center about the angle at which an observer views the hologram recording, that is to say the angle which corresponds to the point of view at the corresponding point along the path of movement.

Adjacent the first portion, the next sequential image corresponding to the next point of view in the sequence is recorded in similar fashion. The recording of the images, one for each of the points of view is repeated on successive sections of the media until images for all of the points of view are recorded holographically along with the corresponding angular visibility characteristics of their corresponding points of view. The resultant exposed media is then developed in accordance with appropriate techniques. In this way, when a viewer peers at the recording of the present invention, each of the viewer's eyes is presented with a hologram of the image of the object, with each eye seeing a different view. The combination of the two views in the brain of the viewer leads to a three-dimensional effect.

The recording of each point of view on its respective section is achieved by using a mask with opposing window slits which allows the preferred section to be exposed. The mask is shifted along the length of the film a distance substantially equal to the width of the slit each time that a new image corresponding to the point of view is to be recorded. The result is a series of strips, each with a diffraction pattern representing a hologram of the image, where the image corresponds to a particular view of the object. The strips are preferably rectangular and parallel to each other, but may be trapezoidal or other shapes. They need not have parallel sides. They may span a dimension of the film. Alternatively, sections or strips may span less than the dimension of the film, and may rather extend in two non-parallel directions, thus creating parallax in two directions. For example, if the sections were rectangular and formed a tile pattern, a "double" or "full" parallax, both vertical and horizontal, would be achieved. It may be advantageous in this instance to have square or diamond-shaped sections.

In accordance with the preferred embodiment, recording is done with a reference beam of light which illuminates one side of the media not covered by a mask, and an object beam which illuminates the other side of the media not covered with a mask. The object beam is modulated with image information by passing it through a screen. As before, the screen may be a flat panel display and is preferably a liquid crystal display. After an exposure is taken, the mask is moved so that a separate part of the media will be exposed. Corresponding to this, the image sent to the screen is altered so that it presents a different view or angular orientation of the object. Then the cycle is repeated until the desired part of the media is exposed.

The laser, which may also be a collimated coherent light source, may typically be a continuous wave laser or a pulsed laser. Either of these emits a pencil of light. The light is split by a beamsplitter into a first and second component, also called an object and reference beam, respectively. The object beam is preferably enlarged by an optical assembly in known fashion, while the reference beam is preferably transformed into a point source by a suitable optic. The object beam passes through the screen which is mounted for rotation through a range of angles which correlate to the sequence of points of view. A turntable, which may be stepper-motor driven, effects the rotation. The turntable may be used to rotate the optical element and the screen. The laser may also be rotated by the turntable if it is small enough to be conveniently mounted. The turntable may be reliably and repeatedly rotated in small fractions of a degree. In a preferred embodiment, the turntable is used to rotate the optical element and screen by one-third of one degree 135 times. In this embodiment, the distance the mask must move changes over the course of the entire exposure. In an alternative embodiment, the angle is changed somewhat over the course of the entire exposure but the distance the mask moves is kept constant.

Prior to the diverged object beam passing through the screen, it may be distorted in known fashion by an optical element. This distortion may serve to broaden or expand the beam, so that a larger portion of the screen may be imaged. One way of achieving this first function is by attenuating the center of the gaussian beam intensity. A second function is that the optical element may serve to transform the cross-section of the for example into a narrow rectangular shape at some distance from the screen, e.g., at or near the plane of the hologram, so that it is most efficient in illuminating a rectangular slit. The pre-distortion may be performed by a holographic optical element or by a conventional lens system. A fiber optic bundle may serve to guide the object beam from the beamsplitter to the optical element.

A preferred embodiment employs a uniform angular difference between sequential points of view and where the path of movement is a portion of a line or circle. In another embodiment, however, the distance between adjacent sections corresponding to different points of view is kept uniform while the angular difference in the object beam is varied in a slightly non-uniform manner. The variation compensates for differences in object beam distance from the point of rotation of the object beam and the media.

In this system, the liquid crystal display may also be used to create a single hologram. In this case, the media would only have one strip or section placed on it. No mask would be necessary in this case.

BRIEF DESCRIPTION OF THE DRAWINGS

One way of carrying out the invention is described in detail below with reference to drawings which illustrate only one specific embodiment of the invention and in which.

BEST MODE FOR CARRYING OUT THE INVENTION

Figure 1:
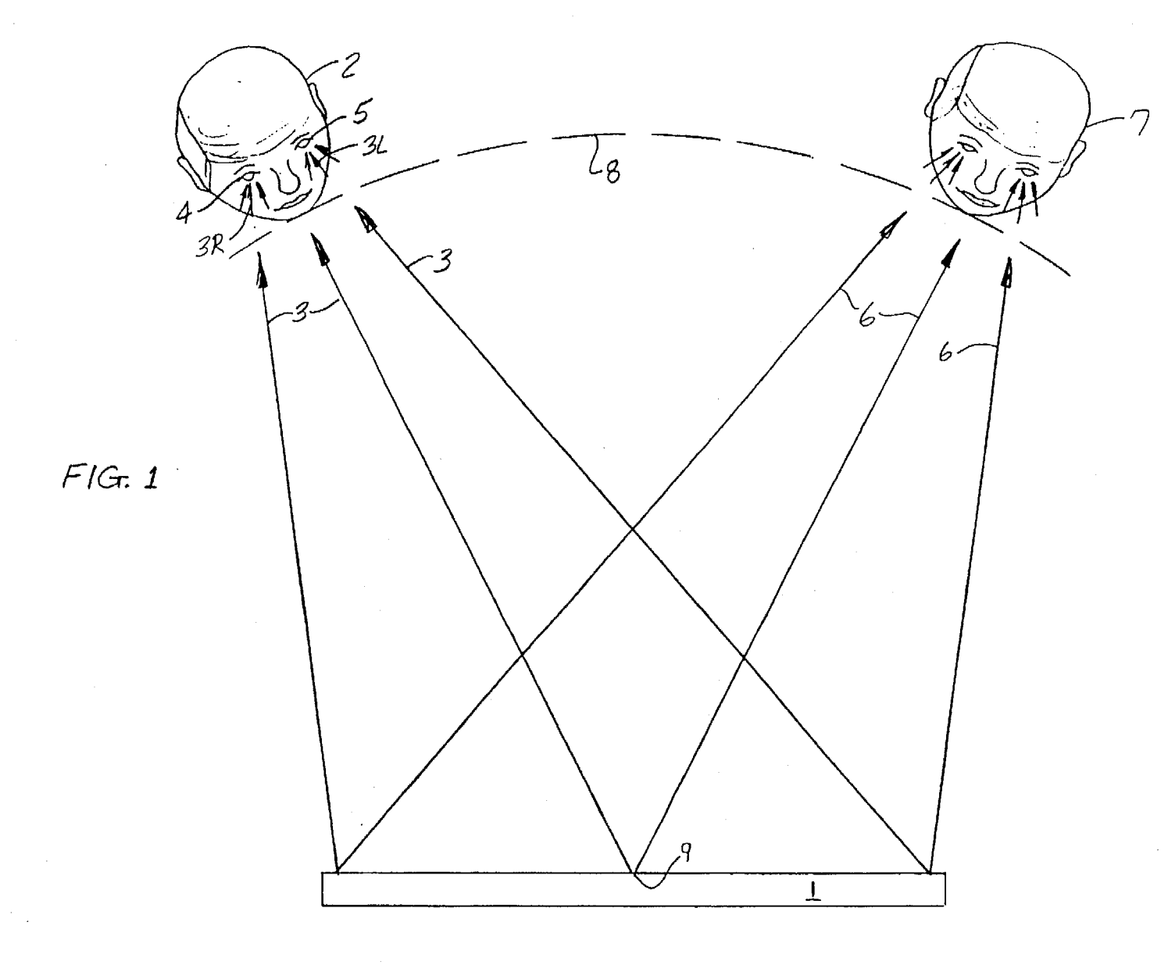
FIG. 1 shows the effect of a changing point of view as a viewer moves radially about a point on the medium of the present invention.

Referring to FIG. 1, desired operation of one possible embodiment of the invention is illustrated. First recording 1 may be viewed by a viewer 2 who sees rays of light 3 emanating from recording 1 and passing through to him. As can be readily understood by those skilled in the art, in order for three-dimensional perception to occur, rays of light 3R and 3L reaching eyes 4 and 5, respectively, of the viewer must correspond to different images corresponding to points of view located coincident with eyes 4 and 5. While the images corresponding to these points of view are slightly different, the difference is such that the brain is able to perceive a three-dimensional visualization of the object whose image is recorded on recording 1.

Similarly, rays of light 6 reaching a viewer 7 located at a different position along an arc 8, along which movement occurs, must be radically different in point of view and, accordingly, content. This results in a substantially different three-dimensional presentation to viewer 7. In accordance with this aspect of the invention, arc 8 would be radially centered at the center 9 of the recording media deposited on the top face of a substantially flat planar face of recording 1.

Alternatively to using recording 1 to provide different views to different viewers, it is also possible for a single viewer to obtain multiple views by keeping his position at a constant point with respect to recording 1 while rotating recording 1 about center 9. This has the effect of allowing the viewer to scan or look around the object recorded in recording 1 without moving his head, in much the same manner as he would observe a hand-held three-dimensional object.

Figure 2:
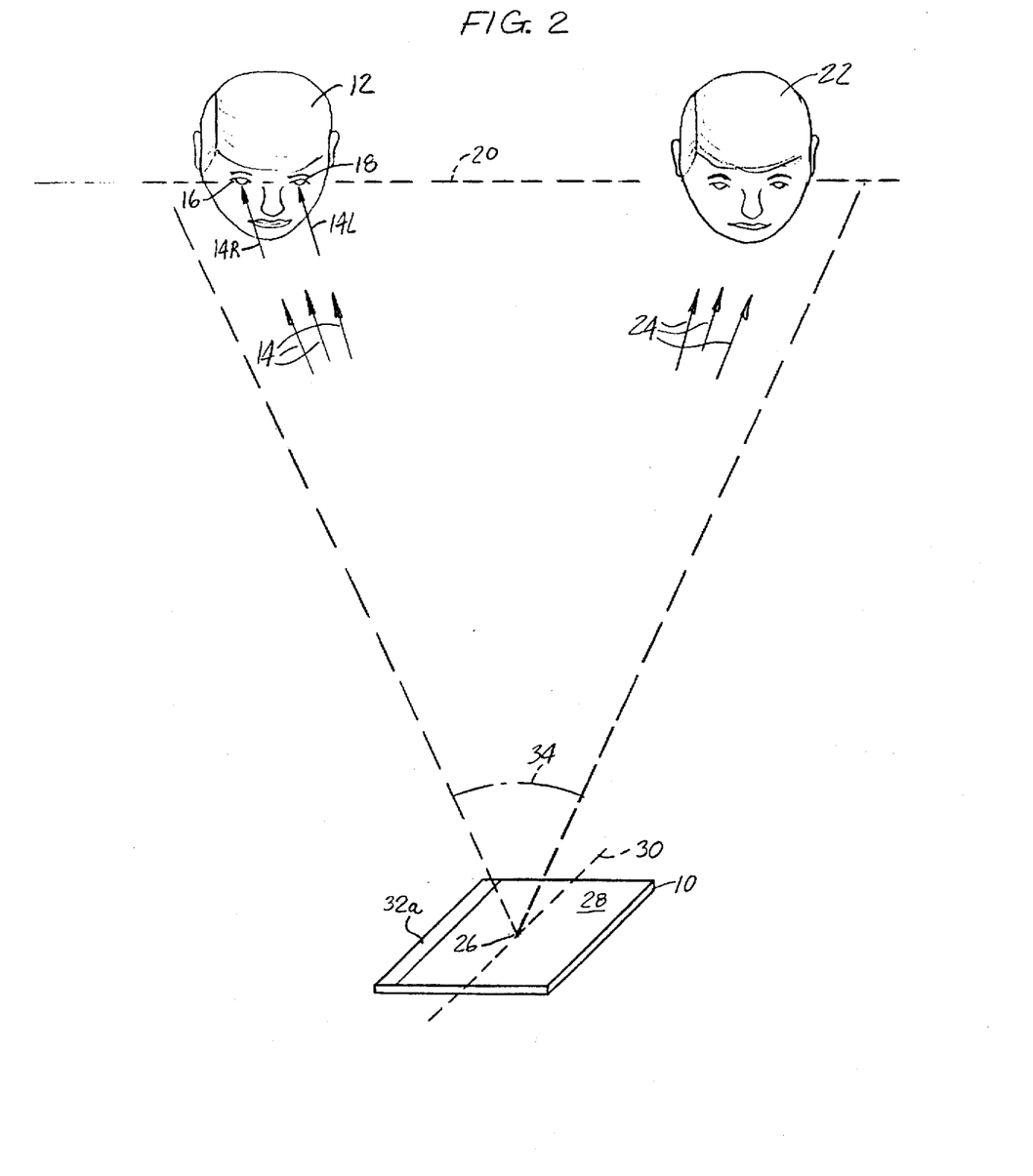
FIG. 2 shows the effect of a changing point of view with respect to the medium of the invention as a viewer moves in a straight line.

An alternative and preferred approach to the problem is illustrated in FIG. 2. Here a recording 10 has image information recorded thereon. The image is recorded in holographic form as a reflection hologram in such a way that a viewer 12 at a first position receives rays of light 14 which convey image information corresponding to points of view for eyes 16 and 18 positioned along linear path of movement 20.

Similar to the embodiment described above, in accordance with the present invention, the rays of light 14R reaching eye 16 convey an image different from the image conveyed by rays of light 14L reaching eye 18. In addition, because path 20 is linear, images reaching different points on path 20 will be scaled differently from images reaching adjacent points because the distance between path 20 and the apparent position of an object recorded in recording 10 varies.

In similar fashion to the embodiment in FIG. 1, viewer 22 positioned at a radically different position will receive rays of light 24 which convey radically different images as compared to rays of light 14. Here again, rotation of recording 10 about a center point 26 of media 28 disposed in the top face of recording 10 will, for a viewer, present a plurality of different views. Typically media 28 is disposed on top of a film. Typical media may include photographic emulsions, photopolymers, or other photosensitive materials known in the art, such as dichromated gelatin, etc.

More particularly, rotation substantially about an axis 30 passing through the media 28 and point 26 will provide what is believed to be the best scanning or look around picture of the object. Rotation of the recording containing media 28 is analogous to rotation of an object in the hands of a person examining that object.

It is also expected that a recording which operates in the manner illustrated in FIG. 2 is preferred, insofar as rotation of recording 10 about axis 30 will more naturally be interpreted by the brain as movement along a straight line. This contrasts with a recording such as that illustrated in FIG. 1 where the unnatural aspect of constant distance rotation may provide an unnatural sense of examination of an object.

Figure 3:
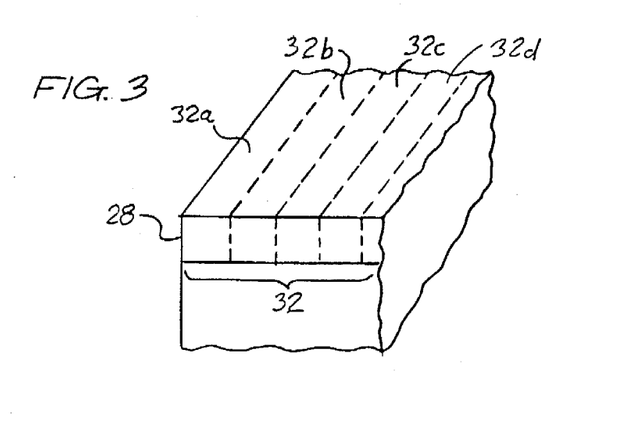
FIG. 3 shows a perspective section of the medium of the present invention.
Figure 4:
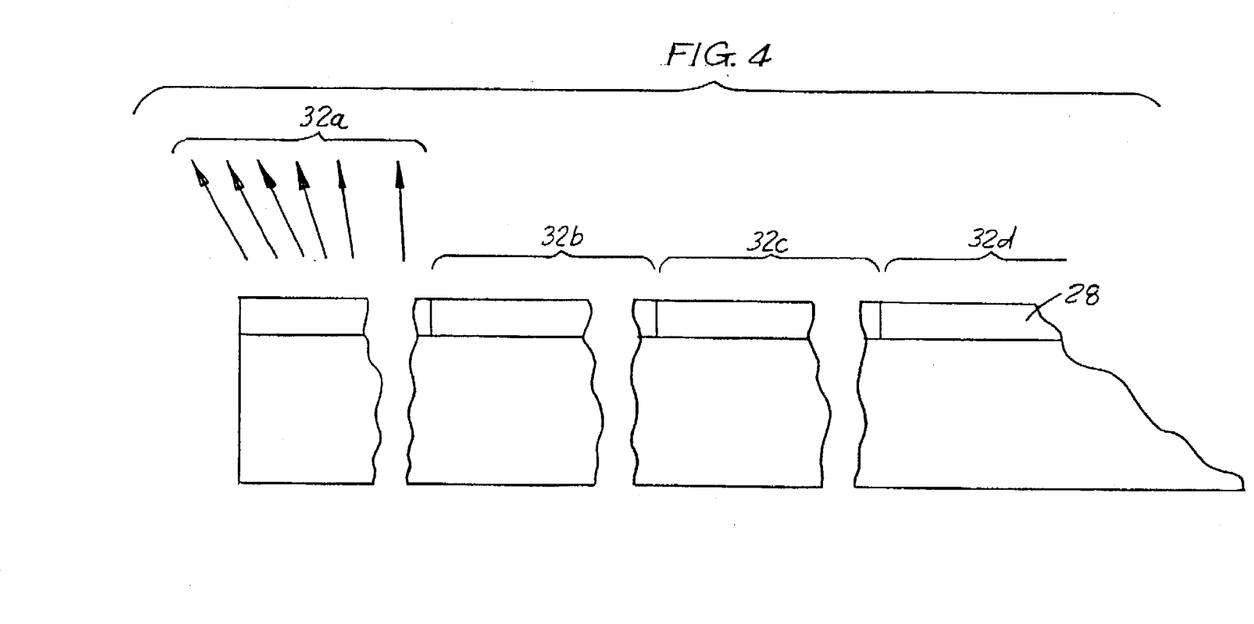
FIG. 4 shows a side section of the medium of the present invention.

In accordance with the present invention, images are stored in recording 10 in the form of a plurality of images each recorded on its own vertical section or strip 32, as illustrated in FIGS. 3 and 4, with each image corresponding to a particular image and depicted object orientation, as more fully explained below. In a manner similar to a vertical raster, each of the vertical sections or strips 32 comprises a ribbon of image information to be presented to the viewer. Each vertical strip 32 has a complete three-dimensional holographic image, with the viewer synthesizing a complete picture at a particular point of view from a plurality of strips of image information. In other words, in accordance with the invention, each of the strips 32 convey information with respect to one of a number of images each corresponding to different points of view along path 20; more particularly, each strip provides a particular view of the object that may be only partially revealed to a viewer, and each partial view of the object is shown by the particular strip which has the image oriented at an angle which is substantially equal to or substantially linearly or non-linearly proportional to the angle between a line of sight between the respective eye and the media 28. Sections or strips 32 are preferably rectangular, for ease of manufacturing, but any shape may be used.

Furthermore, the formation of strips 32 may extend in two non-parallel directions on the media 28, for an enhanced holographic effect. For example, the strips may be square and present a checkerboard pattern on the media. One may then observe the right-to-left aspects of the object by horizontally rotating the recording, and one may observe the top-to-bottom aspects of the object by vertically rotating the recording. This feature is denoted as "full-parallax". The strips extending in one direction provide a first parallax. The strips extending in another non-parallel direction provide a second parallax. In a similar fashion, the strips may also be formed advantageously in a diamond-shaped pattern for an enhanced full parallax effect.

Media 28 is disposed on top of a film substrate. The media may be a photographic emulsion but is preferably a photopolymer.

Referring back to FIG. 2, in accordance with a preferred embodiment of the present invention, path 20 subtends an arc 34 equal to 45 degrees. It is further provided, in accordance with a preferred embodiment of the present invention, that 135 strips 32a–n, with each carrying one of 135 different holographic images. Thus, in accordance with the present invention, images recorded on recording 10 correspond to approximately one-third of one degree of change in angle of image orientation.

This one-third of one degree interval is selected because the views from adjacent positions are of sufficient magnitude to be barely perceived as a change. This results in the coincidence of a minimal change between adjacent views which minimal change is thus 1) minimal yet still perceivable and different in terms of the absolute information in each strip 32, and 2) perceivable with minimum discontinuity a) as the eye synthesizes a full object view from a plurality of strips 32, and b) as the eye views light from a single strip during rotation of recording 10 (see FIG. 6). Thus, the perception of change is smooth as the recording is rotated about axis 30 or as a viewer moves along any path or movement.

Figure 5:
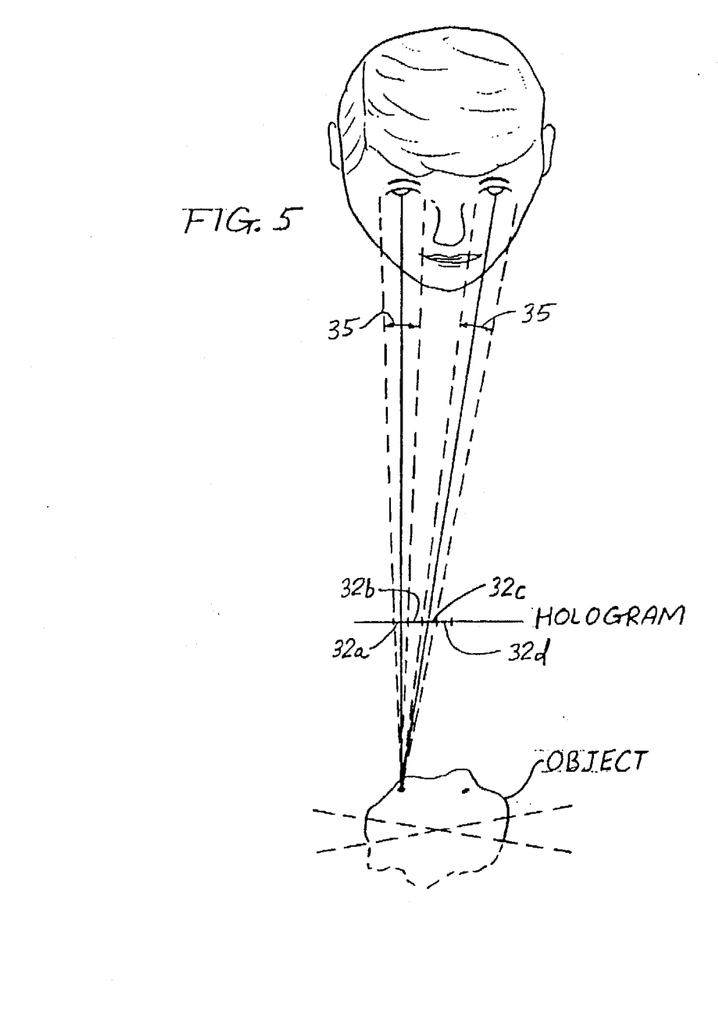
FIG. 5 shows a top view of the medium of the present invention with respect to a viewer's eye and the object presented and viewed, depicting how the viewer sees a three-dimensional object because each of the viewer's eyes receives separate image information.

Referring to FIG. 5, each of the strips 32 emits light representing a particular view of the object being imaged within angles defined by its own subtended arc 35, which is approximately one-third of one degree in width. In order to avoid ambiguous depiction of object views for each of the 135 strips 32a–n, light substantially only depicting a view of the object not presented by the other strips is emitted for viewing by the eye of a viewer along path 20.

In FIG. 5, the viewer sees a three-dimensional object because each eye sees the appropriate light rays, representing views of the object, from various points of view. That is, each eye receives the correct information to replicate the light that the viewer would see if the object were actually present.

Figure 6:
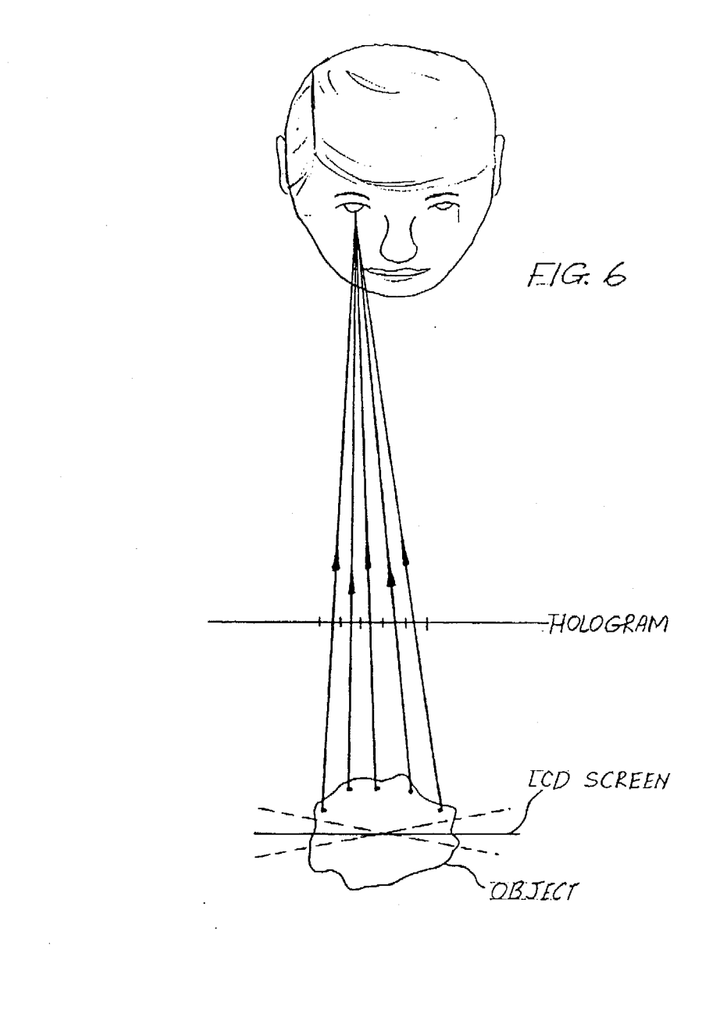
FIG. 6 shows another top section of the medium of the present invention with respect to a viewer's eye and the object presented and viewed, depicting how each eye sees a full lateral extent of the object.

FIG. 6 shows that, for each eye, light produces an image within a top to bottom vertical region of, for example, a left side view of the object being imaged. A next adjacent top to bottom vertical region of the object is depicted by strip 32b. Successive strips 32c, 32d through the 135th strip 32n complete the picture at the point of view of the eye with successive top to bottom vertical regions of the image. In this manner, the above-detailed respective strips all combine to produce an image of a fully formed object viewable by the eye and corresponding to a point of view at the position of the eye. The differences between adjacent slit images are not such that the object appears discontinuous, but the differences are sufficient to allow the two eyes to receive significantly different views so as to recreate the three-dimensional aspects of the object for the viewer.

It is thus seen that for every one-third of one degree of arc 34, as shown in FIG. 2, a separate image is presented. There are thus 135 different images, only one of which is visible along path 20 for each individual pupil subtending one-third of one degree of arc 34. In other terms, it is thus seen that for each image at a particular point of view from its corresponding pupil, different images must be sent by different strips 32 in different directions.

Figure 7:
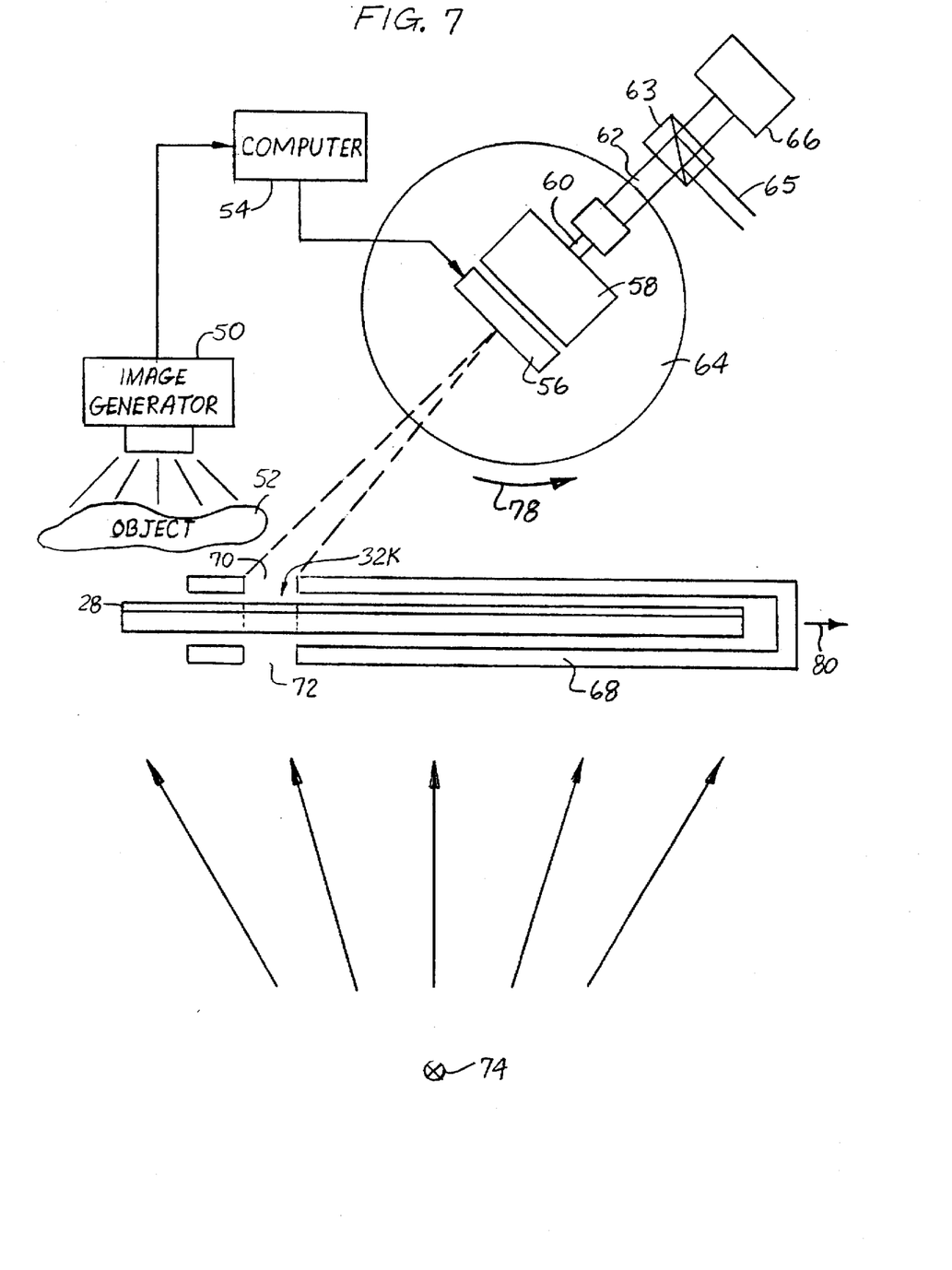
FIG. 7 shows a diagram of the embodiment of the present invention.

Referring to FIG. 7, an apparatus for manufacturing the recording 10 illustrated in FIGS. 2–6 is illustrated. The apparatus comprises, in part, an image generator 50. The image generator may generally be any such generator that transforms data into a three-dimensional image, denoted the image information, of an object 52. This data may be, for example, that from an MRI, or other medical scanner, or that from an architectural rendering, etc. This image information is sent from image generator 50 to a computer 54 which has the capability of outputting a two dimensional image corresponding to any desired angle of view.

The software associated with producing such points of view is well known in the art and forms no part of the present invention. As noted above, the image corresponds to a particular projection of the object, although other types of images keyed to angle of generation and thus point of view will produce useful recordings. Once the image is generated, the same is sent to a screen 56. Screen 56 may be a flat panel display and may, e.g., be a liquid crystal display. Screen 56 effectively functions as the object whose image is to be holographically recorded. Screen 56 is illuminated by a collimated bundle of light from an optical element such as compound lens 58 which is driven by a pencil of laser light 60 delivered by an optical fiber 62 or other optical device.

Prior to its incidence on optical fiber 62, the laser light is split by a beamsplitter 63, and thereafter is diverged by an optical assembly in known fashion (not shown). After passing through the optical fiber, the diverged beam is incident on compound lens 58. Compound lens 58 may include a holographic optical element or alternatively a conventional lens system. In either case, a preferred function of such a component is to pre-distort the beam prior to its incidence on screen 56. The pre-distortion serves in part to broaden or expand the beam, so that a larger portion of the screen may be imaged. It also serves to re-collimate the beam after its initial divergence. This provides a more uniform intensity through dispersion, by attenuating the central Gaussian peak. In this fashion, the screen illumination is uniform and encompasses the entirety of the tissue desired. Another function of the pre-distortion is to transform the beam, for example into a narrow rectangular shape at some distance from the screen, e.g., at or near the plane of the hologram. This is more appropriate for the beam's incidence on the section of the media. Screen 56, lens 58 and bundle 62 are secured to a rotatably mounted turntable 64. The turntable 64 makes it possible to rotate the arrangement at different angles in order to cause light exiting lens 58 and passing through screen 56, i.e., the object beam, to fall upon the undeveloped media 28 at different angles to provide the desired optical characteristics as described. The provision of light through an optical fiber 62 makes it unnecessary to have a heavy laser light source directly mounted on turntable 64. Instead laser source 66 may be located at some remote point. Laser source 66 may be a standard continuous wave laser but is preferably a pulsed laser to allow holograms to be taken rapidly. A typical laser of this pulsed variety may be a pulsed green Nd:YAG laser operating at 532 nm for 15-20 nsec.

Selective exposure of desired positions is achieved by using a double sided mask 68 which includes a pair of facing slits 70 and 72 on opposite sides of media 28. Slits 70 and 72 have a width equal to strip 32. Use of such a slit system would result in generally rectangular sections of the media 28 being exposed. Other shapes for slits would allow other types of sections to be exposed, including, for example, square sections. Light is provided by a coherent point source 74 which is located at a distance approximately two meters from media 28, and is denoted the reference beam 65. The point source 74 is provided by the same laser source 66 after the light has passed through the beamsplitter 63. In this case, the object beam would be one of the beams from the beamsplitter 63, denoted the first component, and the reference beam would be the other, denoted the second component, and shown in FIG. 7 as element 65. The optics for such beam splitting are readily available. To provide the point source, the reference beam 65 would be passed through a suitable optic.

In accordance with the preferred embodiment, turntable 64 is rotated through an angle of approximately forty-five degrees symmetrically about a normal to the midpoint of media 28. In a preferred embodiment, rotation is made in increments of one-third of one degree. At the first position, source 74 and source 66 are simultaneously activated causing the exposure of media by light passing simultaneously through slits 70 and 72. The result is the recording of an interference pattern in media 28 in the position of strip 32a. Exposure is thus made of an image with an angle of orientation corresponding to that of the right pupil of the viewer in FIG. 5.

After exposure of strip 32a, turntable 64 is rotated one-third of one degree in the direction indicated by first arrow 78 and a different image sent to display screen 56. Mask 68 is displaced a distance in the direction indicated by second arrow 80 such that the center of slits 70 and 72 have moved a distance corresponding to the intersection of the optical axis of compound lens 58 and media 28 between the point for that optical axis in the position illustrated in FIG. 7 to the position corresponding to rotation in the direction of first arrow 78 by approximately one-third of one degree.

As noted above, after the first exposure of strip 32a is made, mask 68 is moved in the direction of second arrow 80. Another image, corresponding to an angle of image generation one third of one degree different from that of the previous image, is output by the computer to screen 56 and recorded to create a hologram in strip 32b. This is again done by simultaneous actuation of laser sources 66 and 74 to create an interference pattern within the exposed strip 32b in media 28. After creation of this exposure, turntable 64 is again rotated counterclockwise one-third of one degree and the next different image is recorded on strip 32c. The process is repeated until all of the strips through the 135th have their respective images recorded holographically.

Clearly, as successive rotations of approximately one-third of one degree are made, it is apparent from the geometry of FIG. 7 that displacements will be increasingly smaller until the center of media 28 is passed over, after which distances will gradually increase in a symmetrical fashion.

In a separate embodiment, the angle over which the object beam direction moves is not kept constant. Instead, the distance in which the mask moves is kept constant. In this embodiment, as an example, the rotation angle may be less than one-third of one degree at the extremes of the arc while it is one-third of one degree when the transmitted object beam passes over the center of the film.

To provide the above-mentioned double parallax feature, a larger number of exposures would have to be taken to provide the vertical parallax. If square sections or strips were used, $n^2$ (here $135^2$ or 18,225) images would have to be exposed on the media. Of course, any shape section could be used as long as appropriate masking were applied on the media. In any case, a separate degree of rotation would be applied. For example, turntable 64 may be mounted on another turntable oriented at right angles to it. Then a series of exposures would be taken by rotating turntable 64, followed by a movement of some angle by another turntable, again followed by a series of exposures taken by rotating turntable 64. Finally, the need for another turntable may be negated by rotating the turntable by some other means, including manually, about an axis which is coincident with the vertically centered horizontal axis of screen 56.

In accordance with the present invention, it is possible to make such variations in the above procedure as to change the order in which the various images are recorded. Another variation of the inventive system is to maintain the distance between lines constant and to vary the angle of rotation of the turntable.

Another variation may be to expose the media just once. In this case, the image, as modulated by a liquid crystal display, would be exposed on a part of the media. Therefore, there would be only one section or strip on the entire film.

After exposure of all of the images, the media is developed and fixed in a conventional manner to create the inventive recording 10. The result is a reflection hologram which may be viewed at a wide range of angles to produce an image of an object 52 using relatively low technology equipment, such as a clear high intensity lamp positioned approximately two meters from the finished recording 10.

While an illustrative embodiment of the invention has been described above, it is, of course, understood that various modifications will be apparent to those of ordinary skill in the art. In particular, while the illustrative embodiment discussed pertains primarily to creating a stereoscopic hologram of medically scanned tissues, the invention may also be practiced in such fields as architecture, biology or chemistry. For example, in the field of architecture, renderings of proposed structures or designs may be very effectively demonstrated by such a holographic visualization. As another example, in the laboratory or in an educational environment, a holographic stereogram may be used to depict molecular structures or other such items which have traditionally been the subject of two-dimensional representations but whose features are often difficult to perceive. The invention is also useful in a similar fashion in the biotechnology field or, alternatively, the field of analytical diagnostics. Such modifications are within the spirit and scope of the invention, which is limited and defined only by the appended claims.

What is claimed is:

1. A method of making a holographic stereogram, comprising the steps of holographically recording on a section of an undeveloped layer of a recording medium through a mask a plurality of two-dimensional images from three-dimensional image data, each of said images corresponding to a view of an object at a particular angular orientation; rotationally displacing an object beam carrying one of said images to correspond to a location of said mask, a location of said object beam corresponding to a location of a reference beam; pre-distorting said object beam, said pre-distorting step including transforming a cross-section of said object beam substantially into a first predetermined shape and first orientation at a first distance from said image after being incident on said image, and transforming a cross-section of said object beam substantially into at least a second predetermined shape and at least a second orientation at at least a second distance from said image after being incident on said image; and correlating a location of said mask to said angular orientation of said image in said object beam with respect to a normal plane of reference.

2. The method of claim 1 herein each successive image of said plurality of images varies by a constant angle.

3. The method of claim 2 wherein said constant angle is about one-third of one degree.

4. The method of claim 1 wherein each successive rotation of said object beam corresponds to a displacement of said mask and said reference beam by a constant distance.

5. The method of claim 4 wherein an average rotational angle correlated with said constant displacement is about one-third of one degree.

6. A method of making a recording by which a stereoscopic hologram of an object may be displayed, comprising the steps of:
 a. generating a plurality of different two-dimensional images from three-dimensional image data of said object, each of said images corresponding to a view of said object at a particular angular orientation;
 b. displaying one of said images, said image corresponding to said angular orientation of its respective view, wherein a plurality of points on said image display are included within a plane separating a first area from a second area;
 c. providing a reference beam and an object beam, said object beam rotatable about an axis perpendicular to an object beam axis, and proceeding in a direction from said first area to said second area;
 d. pre-distorting said object beam, said pre-distorting step including transforming a cross-section of said object beam substantially into a first predetermined shape and a first orientation at a first distance from said image display within said second area, and transforming the cross-section of said object beam substantially into at least a second predetermined shape and at least a second orientation at at least a second distance from said image display within said second area;
 e. holographically recording, via an interference of said reference beam and said object beam, said image on a section of an undeveloped layer of a recording medium, said section having a width such that light representing a particular view of said object being so imaged lies within an angle subtended by said section, and substantially no light representing other views of said object being so imaged lies within said angle subtended by said section;
 f. rotating said object beam and said image display about said rotatable axis and repeating steps (b)–(e) for each of said images, said recording performed in different sections of said recording medium; and
 g. developing said medium.

7. The method of claim 6 wherein said medium is a photopolymer.

8. The method of claim 6 wherein said medium is a photographic emulsion.

9. The method of claim 6 wherein said images are from a medical x-ray apparatus.

10. The method of claim 6 wherein said images are from a CT scanning apparatus.

11. The method of claim 6 wherein said images are from an MRI apparatus.

12. The method of claim 6 wherein said images are from a PET apparatus.

13. The method of claim 6 wherein said images are from an ultrasound apparatus.

14. The method of claim 6 wherein said view is converted into an image by being sent to a flat panel display.

15. The method of claim 14 wherein said flat panel display is a liquid crystal display.

16. The method of claim 6 wherein said sections are in a shape of a plurality of strips disposed along a length of said layer of media.

17. The method of claim 6 wherein said first predetermined shape and said at least second predetermined shape are substantially identical.

18. The method of claim 6 wherein said first orientation and said at least second orientation are substantially perpendicular.

19. The method of claim 6 wherein said first distance is substantially a distance to said recording medium and said at least second distance is substantially a distance to a focal point of a viewer.

20. The method of claim 6 wherein said pre-distortion step further includes converging and expanding said object beam.

21. A method of making a recording by which a stereoscopic hologram of an object may be displayed, comprising the steps of:
 a. generating a plurality of different two-dimensional images from three-dimensional image data of said object, each of said images corresponding to a view of said object at a particular angular orientation;
 b. displaying one of said images, said image corresponding to said angular orientation of its respective view;

c. providing a reference beam and an object beam, said object beam rotatable about an axis perpendicular to an object beam axis;

d. pre-distorting said object beam, said pre-distorting step including transforming a cross-section of said object beam substantially into a first predetermined shape and first orientation at a first distance from said image display after being incident on said image display, and transforming a cross-section of said object beam substantially into at least a second predetermined shape and at least a second orientation at at least a second distance from said image display after being incident on said image display;

e. holographically recording, via an interference of said reference beam and said object beam, said image on a section of an undeveloped layer of a recording medium, said section having a width such that light representing a particular view of said object being so imaged lies within an angle subtended by said section, and substantially no light representing other views of said object being so imaged lies within said angle subtended by said section;

f. rotating said object beam and said image display about said rotatable axis and repeating steps (b)–(e) for each of said images, said recording performed in different sections of said recording medium; and g. developing said medium, wherein each of said sections extends in a first direction corresponding to a field of view of said object with a first parallax, and each of said sections extends in a second direction, non-parallel to said first direction, corresponding to a field of view of said object with a second parallax, whereby a matrix of holographic views extending in said first and second directions are disposed on said medium and present a full parallax view when viewed during rotation of said medium in two directions non-parallel to each other.

22. A method for making a recording by which a stereoscopic holographic image of an object may be displayed, comprising the steps of:

a. providing a reference beam from a laser incident on a section of a recording medium on a film which is not covered by a mask;

b. providing an object beam from said laser, said object beam incident on a screen before being incident on said section of said recording medium;

c. pre-distorting said object beam, said pre-distorting step including transforming a cross-section of said object beam substantially into a first predetermined shape and first orientation at a first distance from said screen after being incident on said screen, and transforming the cross-section of said object beam substantially into at least a second predetermined shape and at least a second orientation at at least a second distance from said screen after being incident on said screen;

d. moving said mask on said medium such that a previously covered section of said medium is uncovered;

e. altering said screen such that said screen corresponds to a different view of said object;

f. rotating said object beam and said screen in a direction such that said object beam is incident on said section of said medium so uncovered; and g. successively repeating steps (a)–(f) for a plurality of different views of said object.

23. The method of claim 22 wherein each of said successive rotations is performed over a constant angle.

24. The method of claim 23 wherein said constant angle is about one-third of one degree.

25. The method according to claim 22 wherein each of said successive rotations is performed over a constant angle of about one-third of one degree.

26. The method of claim 22 wherein said mask is moved a constant distance with each repetition.

27. The method of claim 22 wherein said laser is a Nd:YAG laser.

28. The method of claim 22 wherein said laser is a pulsed laser.

29. The method of claim 22 wherein said medium is a photopolymer.

30. The method of claim 22 wherein said medium is a photographic emulsion.

31. The method of claim 22 wherein said screen is a flat panel display.

32. The method of claim 31 wherein said flat panel display is a liquid crystal display.

33. The method of claim 31 wherein said different views of said object are generated by transmitting images of different angular orientations of said object to said flat panel display.

34. The method of claim 22 wherein said pre-distortion step further includes converging and expanding said object beam.

35. A method for making a recording by which a stereoscopic holographic image of an object may be displayed, comprising the steps of:

a. providing a reference beam from a laser incident on a section of a recording medium on a film which is not covered by a mask;

b. providing an object beam from said laser, said object beam incident on a screen before being incident on said section of said recording medium;

c. passing said object beam through a holographic optical element prior to said object beam's incidence on said screen, said holographic optical element pre-distorting said object beam, said pre-distortion including transforming a cross-section of said object beam substantially into a first predetermined shape and first orientation at a first distance from said screen after being incident on said screen, and transforming a cross-section of said object beam substantially into at least a second predetermined shape and at least a second orientation at at least a second distance from said screen after being incident on said screens;

d. moving said mask on said medium such that a previously covered section of said medium is uncovered;

e. altering said screen such that said screen corresponds to a different view of said object;

f. rotating said object beam and said screen in a direction such that said object beam is incident on said section of said medium so uncovered; and g. successively repeating steps (a)–(f) for a plurality of different views of said object.

36. The method of claim 35 wherein said pre-distortion includes dispersing said object beam.

37. The method of claim 36 wherein said pre-distortion step further includes converging and expanding said object beam.

38. The method of claim 35 wherein said pre-distortion transforms a cross-section of said object beam substantially into a shape corresponding to said section of said recording medium which is not covered by said mask at some distance from said screen.

39. The method of claim 38 wherein said section of said recording medium which is not covered by said mask is rectangular.

40. The method of claim 38 wherein said section of said recording medium which is not covered by said mask is diamond-shaped.

41. A method for making a recording by which a stereoscopic holographic image of an object may be displayed, comprising the steps of:
   a. providing a reference beam from a laser incident on a section of a recording medium on a film which is not covered by a mask;
   b. providing an object beam from said laser, said object beam incident on a screen before being incident on said section of said recording medium;
   c. passing said object beam through an optical system prior to said object beam's incidence on said screen, wherein said optical system pre-distorts said object beam and said pre-distortion includes transforming a cross-section of said object beam substantially into a first predetermined shape and first orientation at a first distance from said screen after being incident on said screen, and transforming a cross-section of said object beam substantially into at least a second predetermined shape and at least a second orientation at at least a second distance from said screen after being incident on said screen;
   d. moving said mask on said medium such that a previously covered section of said medium is uncovered;
   e. altering said screen such that said screen corresponds to a different view of said object;
   f. rotating said object beam and said screen in a direction such that said object beam is incident on said section of said medium so uncovered; and
   g. successively repeating steps (a)–(f) for a plurality of different views of said object.

42. The method of claim 41 wherein said pre-distortion step further includes converging and expanding said object beam.

43. A recording by which a stereoscopic holographic image of an object may be displayed, comprising:
   a film;
   a recording medium on said film, said medium capable of photographic development to secure a diffraction pattern incident thereon, said diffraction pattern formed by an interference of an object beam and a reference beam, wherein said object beam is pre-distorted and said pre-distortion includes transforming a cross-section of said object beam substantially into a first predetermined shape and first orientation at a first distance from said object after being incident on said object, and transforming a cross-section of said object beam substantially into at least a second predetermined shape and at least a second orientation at at least a second distance from said object after being incident on said object; and
   a plurality of sections of said medium, each section including a diffraction pattern corresponding to a different view of said object, each section formed by said interference of said object beam and said reference beam wherein said object beam is incident upon said recording medium at a different angle for each pair of adjacent sections;
   such that a left eye of a viewer receives a first view from a first section and a right eye of a viewer receives a second view from a second section.

44. The recording of claim 43 wherein each of said plurality of sections is a quadrilateral shape.

45. The recording of claim 44 wherein each of said quadrilateral shapes is parallel to each other of said quadrilateral shapes.

46. The recording of claim 44 wherein said plurality of quadrilateral shapes extends in two non-parallel directions on a plane of said film.

47. The recording of claim 46 wherein each of said quadrilateral shapes is square.

48. The recording of claim 46 wherein each of said quadrilateral shapes is diamond-shaped.

49. The recording of claim 46 wherein each of said quadrilateral shapes is rectangular.

50. The recording of claim 43 wherein said medium is a photopolymer.

51. The recording of claim 43 wherein said medium is a photographic emulsion.

52. The recording of claim 43 wherein said pre-distortion step further includes converging and expanding said object beam.

53. An apparatus for manufacturing a recording of a stereographic holographic image of an object, comprising:
   a laser;
   a beamsplitter for splitting light from said laser into a first component and a second component;
   a screen for displaying an image of an object, said screen modulating an amplitude and phase of said first component of light;
   a first optical system accepting said first component of light from said laser, pre-distorting said first component of light from said laser, said pre-distortion including transforming a cross-section of said first component of light from said laser substantially into a first predetermined shape and first orientation at a first distance from said screen after being incident on said screen, and transforming a cross-section of said first component of light from said laser substantially into at least a second predetermined shape and at least a second orientation at at least a second distance from said screen after being incident on said screen, and outputting said first component of light so pre-distorted; and
   a second optical system for transmitting said second component of light such that said second component of light interferes with said first component of light.

54. The apparatus of claim 53 further comprising a mask with two opposing slits, such that said interference of said first and second components of light from said laser occurs substantially at said slits.

55. The apparatus of claim 53 further comprising an optical fiber for transmitting said first component of light from said laser to said first optical system.

56. The apparatus of claim 53 wherein said screen is a flat panel display.

57. The apparatus of claim 56 wherein said flat panel display is a liquid crystal display.

58. The apparatus of claim 53 further comprising a rotatable element on which is mounted said first optical system and said screen.

59. The apparatus of claim 58 wherein said rotatable element is mechanically driven in increments of fractions of a degree.

60. The apparatus of claim 53 wherein said first optical system transforms said first component of light from said laser into a quadrilateral cross-section.

61. The apparatus of claim 53 further comprising an image generator for providing said image of said object.

62. The apparatus of claim 61 wherein said image generator receives image information from an x-ray scan.

63. The apparatus of claim 61 wherein said image generator receives image information from a PET scan.

64. The apparatus of claim 61 wherein said image generator receives image information from a CT scan.

65. The apparatus of claim 61 wherein said image generator receives image information from an MRI scan.

66. The apparatus of claim 61 wherein said image generator receives image information from an ultrasonic imaging scan.

67. The apparatus of claim 53 further comprising an optic for transforming said second component of light from said laser into a point source.

68. The apparatus of claim 53 wherein said pre-distortion step further includes converging and expanding said object beam.

69. An apparatus for manufacturing a recording of a stereographic holographic image of an object, comprising:
   a laser;
   a beamsplitter for splitting light from said laser into a first component and a second component;
   an holographic optical element accepting said first component of light from said laser, said holographic optical element transforming a cross-section of said first component of light from said laser substantially into a first predetermined shape and first orientation at a first distance from said screen after being incident on said screen, and transforming a cross-section of said first component of light from said laser substantially into at least a second predetermined shape and at least a second orientation at at least a second distance from said screen after being incident on said screen, and outputting said first component of light from said laser so transformed;
   a screen for displaying an image of an object, said screen modulating an amplitude and phase of said first component of light from said laser; and
   an optical system for transmitting said second component of light from said laser such that said second component of light from said laser interferes with said first component of light from said laser.

70. The apparatus of claim 69 wherein said holographic optical element performs a pre-distortion including dispersing said first component of light from said laser to carry out said transformation.

71. The apparatus of claim 70 wherein said pre-distortion step further includes converging and expanding said object beam.

72. An apparatus for manufacturing a recording of a stereographic holographic image of an object, comprising:
   a laser;
   a beamsplitter for splitting light from said laser into a first component and a second component;
   a first optical system accepting said first component of light from said laser, transforming said first component of light from said laser, and outputting said first component of light from said laser so transformed;
   a screen for displaying an image of an object, said screen modulating an amplitude and phase of said first component of light from said laser;
   a holographic optical element accepting said transformed first component of light from said laser, pre-distorting said transformed first component of light from said laser, said pre-distortion including modifying a cross-section of said transformed first component of light from said laser substantially into a first predetermined shape and first orientation at a first distance from said screen after being incident on said screen, and modifying a cross-section of said transformed first component of light from said laser substantially into at least a second predetermined shape and at least a second orientation at at least a second distance from said screen after being incident on said screen, and outputting said transformed first component of light from said laser so pre-distorted; and
   a second optical system for transmitting said second component of light from said laser such that said second component of light from said laser interferes with said first component of light from said laser.

73. The apparatus of claim 72 wherein said pre-distortion step further includes converging and expanding said object beam.

* * * * *